Figure 1:
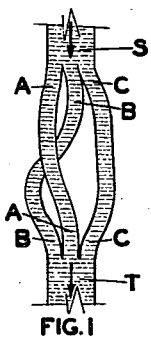

Nov. 12, 1946.  A. J. DEYRUP  2,411,031

MANUFACTURE OF OPTICAL GLASS

Filed March 10, 1943

INVENTOR.
ALDEN J. DEYRUP

BY  E. H. O'Brien
ATTORNEYS.

Patented Nov. 12, 1946

2,411,031

UNITED STATES PATENT OFFICE 2,411,031

MANUFACTURE OF OPTICAL GLASS

Alden J. Deyrup, Westfield, N. J., assignor to E. I. du Pont de Nemours & Company, Wilmington, Del., a corporation of Delaware Application March 10, 1943, Serial No. 478,649

2 Claims. (Cl. 49—77)

This invention relates to the manufacture of glass which is relatively free from solid or gaseous inhomogeneity. More particularly, it relates to the preparation of glass of a completely homogeneous character, free from "seeds, cords, and striae," the resulting glass being satisfactory for use in the manufacture of optical instruments.

In the commercial preparation of glass the glass batch is melted in a refractory container and the melted glass, after melting and fining, is either drawn off and formed or, as is usual in the case of optical glass, cooled in the container and broken out in chunks. Manufactured glass is usually not completely homogeneous but contains small gaseous bubbles termed seeds as well as inhomogeneities due to composition such as cords and striae. Reduction of the extent of these inhomogeneities has attracted the extensive attention of experts in the field of glass manufacture, and considerable progress has been made in eliminating them. Seeds in commercial glassware are generally few and small in size, and striae have been reduced to the point where they cause no substantial weakening of properly annealed glass.

When glass of good optical qualities is desired, however, serious difficulties are encountered in diminishing the striae to a sufficient extent. Striae in optical glass are considered to result from variation in the composition of the glass from point to point throughout the glass. These variations in composition are generally attributed to the effect of solution of the crucible or refractory wall wherein the glass batch is positioned, as well as to volatilization of constituents of the glass, such as alkali metal oxides, from the surface of the glass melt. In the modern manufacture of optical glass the batches are melted in individual crucibles and the melt stirred mechanically, the cooling taking place rapidly under controlled conditions to arrest the intermingling of striae, which may be formed at the crucible wall and surface, with the remainder of the homogenized glass. It is then necessary to break the glass into chunks and to select suitable pieces free from striae as determined by careful physical inspection. Glass of high quality can be prepared by melting the batches in pots formed of inert metals such as platinum. This is objectionable, however, in that it involves the use of equipment of considerable expense. Moreover, not all the striae are eliminated under such conditions, possibly because vaporization of constituents of the glass may still occur from the top of the crucible. The utilization of pots of inert metal is also limited by the fact that many useful glasses, such as lead glasses, cannot be safely melted in platinum crucibles because contact of these glasses with combustion gases in the melting furnace may liberate reduced metals such as lead, which then alloy with the platinum thereby ruining the crucible.

Various attempts have been made to effect homogenization of glass by stirring at low temperatures and high viscosities in order to minimize the rate of formation of striae caused by solution of the refractory. However, it has been found that attempts to stir or mix glass at low temperatures (high viscosities) generally fail because large quantities of air are entrapped during the process of stirring.

I have now discovered a procedure whereby homogenization may be effected, either at high viscosities or at low viscosities, as desired, without the entrapment of air bubbles. Not only are air bubbles not entrapped but, on the contrary, there occurs during this treatment a partial fining or elimination of bubbles which may originally be present in the glass melt.

My improved procedure involves first effecting the preliminary melting of the glass batch, with or without preliminary fining and stirring, followed by passage of the glass, as a stream, or in continuous flow, into a homogenizer. The homogenizer comprises an essential element, serving to carry out an essential step in my process. Basically, it consists of a means for splitting the entering stream of fluid glass into a plurality of streams, the resulting streams being then recombined in an order different from that in which they were initially split. This results in shuffling or intermingling of the streams.

Figure 2:
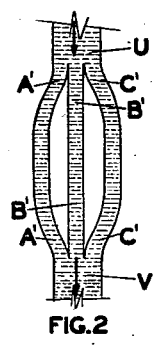
Figure 3:
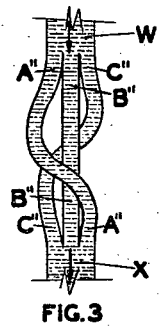

My invention may best be described with reference to the diagrams constituting the accompanying drawing. Figure 1 illustrates the type of recombination desired where streams of glass having an initial order denoted A—B—C are shuffled and recombined to have the order B—A—C. Figure 2 represents sequential recombination of streams of molten glass, and Figure 3 represents inverse sequential combination of a stream split initially into three portions. When treating the glass in accordance with the procedures illustrated in these Figures 2 and 3, recombination of the streams of glass in a shuffled order does not occur, the final streams, A, B, and C, preserving their respective positions with respect to one another that they initially presented at the moment of splitting or subdivision of the main stream.

Figure 4:
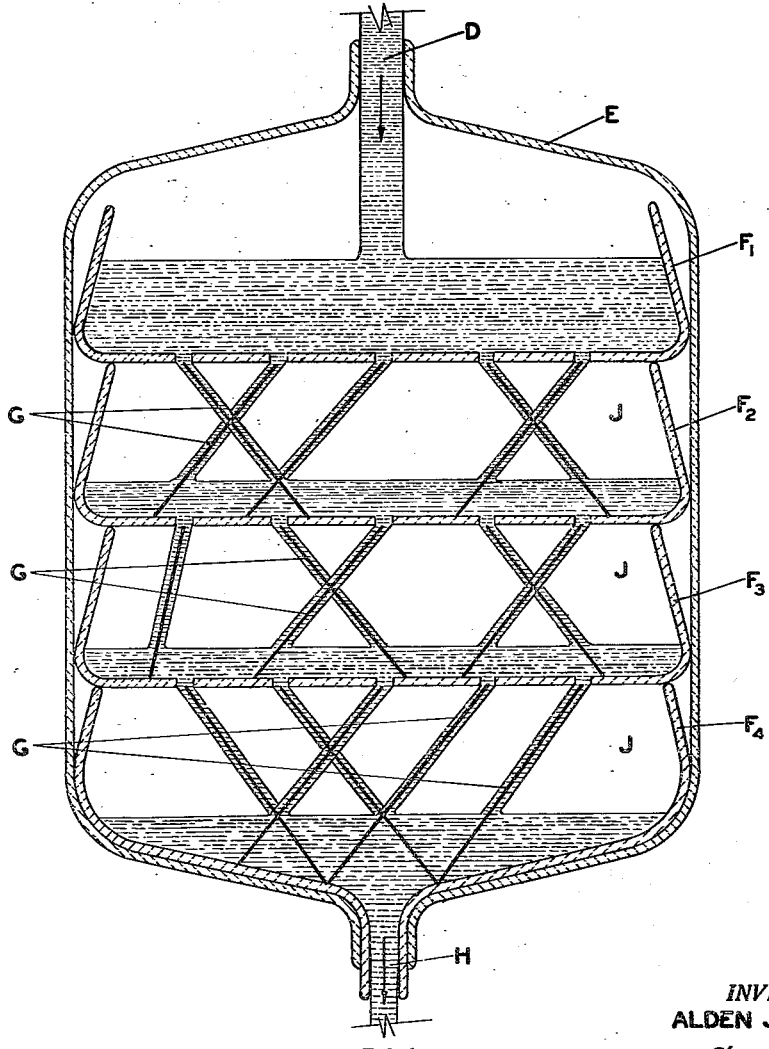

Figure 4 represents, diagrammatically, an apparatus wherein such splitting and intermingling of streams may be carried out, the specific embodiment illustrated comprising three separate units in series of five streams each, formed by subdivision of the main body of molten glass.

Referring particularly to Figure 1, it is evident that the stream S of fluid glass is divided into three portions and recombined, as at T, in an order different from that in which the three subdivided streams were initially present. This represents the shuffling type of recombination and can be effected by suitably designing the homogenizer apparatus. In practice, this homogenizer should be so designed that no bubble entrapment will occur, either in separation, or in the recombination of the fluid streams of glass. The schematic unit illustrated in Figure 1 will provide, of course, only partial mixing, as commercially effective embodiments of my invention, utilizing principles in accordance with this diagram, will contain various units providing either a plurality of subdivided streams, a plurality of units, or both a plurality of units and plurality of streams.

In Figure 2 the initial stream of flowing glass U is subdivided into the three streams A', B', and C' which are then recombined in the same order to form the stream V. In Figure 3, the flowing stream of molten glass W is subdivided into the three streams A'', B'', and C'' which are then recombined, unshuffled but in the reverse order, to form the stream X. The types of recombination of streams represented in these Figures 2 and 3 are not the desired type of shuffling recombination and are to be avoided in the practice of my invention, since they do not result in the thorough mixing secured by the shuffling recombination illustrated in Figure 1.

Figure 4 specifically illustrates an embodiment of my homogenizer apparatus providing both a plurality of units and a plurality of streams, the apparatus illustrated in the diagram comprising three units each effecting a subdivision of the main body of glass into a series of five streams each. In this figure, D represents the original inflowing stream of molten glass flowing into the homogenizer. E is the rigid shell or container of refractory material, for example, formed of a ceramic refractory, this shell or container being surrounded by a heated furnace (not shown). $F_1$, $F_2$, $F_3$, and $F_4$ are perforated rigid "dishes" of refractory material not readily soluble in the molten glass. They may be constructed of platinum or of the usual ceramic refractories. The letter G is used to denote leaders, guide rods, or wires, which serve to direct the streams of molten glass exuding through the perforations as the result of gravitational flow in such a manner as to cause shuffling of these streams. These members may be formed of platinum wire, ceramic refractory rods, or other suitable material. The letter H denotes the effluent stream of homogenized glass, formed by the final commingling of the individual streams.

In practice, and as illustrative of complete glass-making operations, the inflowing stream D may flow from a continuous melting tank, to which tank is fed either the raw glass batch, or premelted glass chunks. The effluent stream of glass H may be cut into gobs preliminary to pressing to shape, or may be drawn through formers into an annealing lehr, thus forming continuous rods or sheets. The empty spaces between successive dishes $F_1$, $F_2$, $F_3$, $F_4$, etc. space not occupied by the flowing subdivided streams of molten glass, are marked J in Figure 4, and may be either connected to each other, or hermetically sealed from each other as desired.

As an example of homogenization in accordance with my invention, a homogenizer similar to that shown in Figure 4 but having five units or dishes F with ten perforations each, and ten leaders G for each unit or dish F was set up in a vertical tube furnace. Glass chunks were melted in a perforated crucible resting on top of the homogenizer. These glass chunks were of a badly striated and seedy glass having the following approximate composition, the product being a typical lead-flint optical glass:

| | Per cent |
|---|---|
| Silica, $SiO_2$ | 46.5 |
| Sodium oxide, $Na_2O$ | 5.0 |
| Potassium oxide, $K_2O$ | 1.1 |
| Calcium oxide, $CaO$ | 0.3 |
| Lead oxide, $PbO$ | 47.0 |
| Arsenic oxide, $As_2O_3$ | 0.1 |

All percentages are by weight, based on the total weight of the glass.

The tube furnace was operated at 920° C., and a continuous rod of glass was removed from the lower end of the homogenizer. Inspection of this glass showed marked improvement in the quality thereof, illustrated by considerable reduction in the extent of striation and number of seeds.

A further test was now carried out to measure more accurately the degree of mixing. A chunk of cobalt blue glass weighing 10 grams was added to the glass entering the homogenizer shown in Figure 4. The effluent glass was tinted blue through a very large volume thereof. The blue tinted glass was cut out of the block or mass and found to weigh 970 grams. This indicates a surprisingly large amount of mixing, as the chunk of cobalt blue glass was mixed with almost one hundred times its own weight of another glass. In contrast, a chunk of blue glass weighing 10 grams placed in 500 grams of clear glass in a crucible at the same temperature remained for many hours without coloring the bulk of the glass through mixing or diffusion.

The mixing and shuffling of the streams of molten glass may be accomplished solely by gravitational flow. It is obvious that the homogenizing system may be completely enclosed and hermetically sealed against combustion gases, no mechanically moving parts being present in said system. Isothermal conditions may also be maintained, thus preventing striae which might result by evaporation of constituents of the glass from exposed surfaces of the molten glass body. The ease and practicability of hermetically sealing the system against combustion gases permits the use of platinum and similar inert metals, thereby reducing contamination of the glass to the minimum amount.

In ordinary operations the homogenizer is maintained at substantially uniform temperature, from influx of the glass to its efflux in recombined condition from the apparatus.

It should be noted that the operation of my improved homogenizing apparatus does not depend on the exact number of shuffling units or streams per unit of the apparatus. Generally, it has been observed that increasing both the number of shuffling units and the number of streams per unit results in increased efficiency of mixing, and therefore a superior quality optical glass.

While I have described my invention with reference to certain preferred specific embodiments thereof, I do not wish to be limited thereto, as obvious modifications will occur to those skilled in the art which do not differ from the spirit or scope of the invention.

I claim:

1. The method for homogenizing glass which comprises melting a glass mass, simultaneously withdrawing contiguous portions of said mass in adjacent separate streams, interspersing said adjacent streams and uniting them to form a second glass mass in which some contiguous portions were non-contiguous portions in said first-named glass mass.

2. The method for homogenizing glass which comprises melting a glass mass, simultaneously withdrawing contiguous portions of said mass in adjacent separate streams, interspersing said adjacent streams and uniting them to form a second glass mass in which some contiguous portions were non-contiguous portions in said first-named glass mass and repeating said withdrawal of contiguous portions of succeeding glass masses in adjacent separate streams, interspersing said adjacent streams and uniting them to form succeeding glass masses in which some contiguous portions were non-contiguous portions in preceding glass masses.

ALDEN J. DEYRUP.